United States Patent Office 3,459,265
Patented Aug. 5, 1969

3,459,265
METHOD FOR RECOVERING VISCOUS OIL BY STEAM DRIVE
Thomas S. Buxton and Jack L. Shelton, Tulsa, Okla., assignors to Pan American Petroleum Corporation, Tulsa, Okla., a corporation of Delaware
No Drawing. Filed July 28, 1967, Ser. No. 656,642
Int. Cl. E21b 43/24
U.S. Cl. 166—263        9 Claims

ABSTRACT OF THE DISCLOSURE

Viscous oil is recovered more easily from an underground formation by heating it with steam. Injection of steam is facilitated by forming and enlarging flow channels for the steam by injecting into the formation a mixture of an inert gas, such as methane, and an oil solvent, such as propane. A channel may be formed from a single well by injecting the mixture and then releasing the pressure so oil thinned by the solvent flows back into the well. A channel may also be formed between two wells or between an injection well and several outlet wells. Fractures may be formed to aid channel formation.

---

In many oil-bearing earth formations, the oil is so viscous that recovery of the oil from the formation is difficult. It has been proposed that steam be injected into such formations to heat the oil and cause it to become less viscous. Injection of anything, including steam, into formations containing viscous oils is difficult. In order to inject enough steam into the formation in a reasonable length of time to do much good, very high injection pressures are required. In order to maintain the steam in the vapor state at high pressure, the temperature must also be high.

In one way, the use of high pressure, high temperature steam is advantageous since a given volume of steam carries more heat into the formation at high temperature and high pressure than the same volume at low pressure and low temperature. In another way, however, the high pressure and corresponding high temperature are disadvantageous. They lead to high heat losses. It is rarely necessary to heat even a very viscous oil more than 100° or 200° F. in order to reduce the viscosity to a value which permits producing the oil from the formation into a well. Any heating in excess of this amount is wasted. It should be recalled also that in heating the oil the formation containing the oil must also be heated. This is also wasted heat. The higher the temperature, the greater the amount of wasted heat. In addition, heat is lost from the heated oil-bearing formation to the surrounding non-productive formations. The higher the temperature of the oil-bearing formation, the greater is the loss of heat to the nonproductive formations. It is generally desirable, for the above reasons, to inject a large volume of steam into an oil-bearing formation at low pressure so the temperature can also remain low and thus keep the heat costs low.

If large volumes of steam are to be injected into formations at low pressures, large flow channels must be present. Ordinarily, such channels are not available in formations containing viscous oil. It has been suggested that a solvent be injected into a formation to form channels from the injection well to a recovery well, steam then being forced through the channels to heat the formation and recover the oil. Unfortunately, many viscous oils contain a large amount of asphalt. Contact of such viscous oils with large volumes of liquid solvents, such as propane, butane, and the like, precipitates the asphalt and plugs the formation to at least some degree. It is well known to form fractures in a formation penetrated by a well to provide high flow capacity channels around the well. It is difficult, however, to connect wells by means of fractures. Some fracturing liquids are also capable of precipitating asphalt from viscous crudes.

In some cases, very viscous oils are paraffin base. In these cases, there is no problem of asphalt precipitation. Experience has shown, however, that efforts to force solvents through formations containing such oils also result in plugging of the formations. Apparently, the solvent in flowing through the formation dissolves the viscous oil. The viscous oil content continues to increase until there is a band of oil containing little solvent extending ahead of the solution of oil in the solvent. The oil in this band becomes so viscous that further flow is substantially blocked. Thus, whether the viscous oil is asphalt base or paraffin base, efforts to use solvents to establish flow channels for steam encounter difficulties.

An object of this invention is to provide a process for steam-heating a formation at low pressure and correspondingly low temperature to avoid excessive heat losses. Another object of the invention is to provide a process in which at least one high-flow-capacity channel is formed in a formation containing viscous oil and a large volume of steam is then injected into the channel at low pressure and low temperature to heat the formation. A more specific object of the invention is to provide a method for forming a high-flow-capacity channel in a formation containing viscous asphalt-base oil, the method causing little, if any, asphalt precipitation. A still more specific object is to form a high-flow-capacity channel connecting two wells penetrating a formation containing viscous oil so steam can be injected from one well to another to heat the formation at low pressure and correspondingly low temperature. Still other objects will be apparent from the following description and claims.

In general, we accomplish the objects of our invention by forcing through the formation before introducing steam a mixture of an inert gas and a limited amount of an oil-soluble material, the mixture being entirely in the vapor phase. Preferably, the mixture is preceded by inert gas alone. For example, methane gas may be used as the inert gas while the oil-soluble solvent may be propane, butane, or the like.

Since an inert gas is present, gas permeability is maintained open. The gas-filled pores cannot be filled with a solution of oil in liquid solvent. Since there is a very large difference in viscosities between the gas and the oil, the gas tends to finger very rapidly through the oil and establish at least small flow channels. The solvent dissolving in the oil from the vapor phase dilutes the viscous oil, reducing its viscosity, so the injected vapor phase can force the oil outwardly, away from the gas flow channels, thus enlarging the channels. Since the volume of solvent dissolved in the oil is limited because of the limited concentration of solvent in the vapor, insufficient solvent is present in the oil to cause serious asphalt precipitation.

It will be helpful at this point to present an example of a preferred application of our process. A formation 20 feet thick extends from a depth of 800 feet to 820 feet. The formation contains oil having a viscosity of about 5,000 centipoises at a formation temperature of about 80° F. The formation is penetrated by two wells 330 feet apart. For convenience, these will be called Well A and Well B. Our process is applied to the formation through these wells. In the example, all pressures are in pounds per square inch gage and all volumes are under standard conditions of 14.7 pounds per square inch gage and 60° F.

First, methane is injected into Well A, while Well B is left open. The methane is injected at a rate of about 10,000 cubic feet per hour at a surface pressure of about 1,000 pounds per square inch. After about a million cubic feet of methane are injected, a gaseous mixture of 80 percent methane and 20 percent propane is injected, both percentages being by volume. After injecting about 8 million cubic feet of this mixture at about 1,000 pounds per square inch, gas production from Well B increases sharply indicating breakthrough of gas injected into Well A. Gas from Well B is blended with about 20 percent by volume of propane and re-injected into Well A.

After injecting another 10 million cubic feet of the mixture, the injection rate has increased so that 10,000 cubic feet per hour of the mixture can be injected at only 700 pounds per square inch surface pressure. At this point, injection into Well A is terminated and injection of the 80-percent methane, 20-percent propane mixture into Well B is initiated. Well A is opened, gas is produced and cycled to Well B. At first, no propane addition to the gas from Well A is needed. As gas production from Well A continues, the propane content drops. An occasional analysis of the gas is made and enough propane is added to bring the concentration to about 20 percent before the gas is injected into Well B.

After injecting about 6 million cubic feet of gas into Well B while producing Well A, the injection rate has increased until 10,000 cubic feet per hour can be injected at a pressure of only 600 pounds per square inch.

At this point, injection of the enriched gas into Well B is terminated and injection of steam into Well A at a pressure of 600 pounds per square inch is initiated. Well B is opened. After injection of about 75,000 barrels of water as steam into Well A, steam appears at Well B. At this time, Well B is producing oil at the rate of about 10 barrels per day. The rate is increasing as the temperature increases and viscosity decreases.

The steam injection rate into Well A is slowly reduced until only water at about 330° F. (saturation temperature at a bottom-hole pressure of about 100 pounds per square inch absolute) is being produced into Well B. This is done to avoid loss of the latent heat of steam with the produced steam. As steam injection continues, the injection becomes easier as the oil is heated and the steamflow channel is enlarged. The steam injection pressure is decreased to maintain the condition of producing only water at about 330° F. at Well B.

After injecting about 50,000 barrels of water as steam, the formation and oil are heated so only about 400 pounds per square inch pressure is required to inject sufficient steam to cause the steam to sweep through the reservoir as a vapor carrying the oil with it to the producing well. Steam injection is continued to drive the oil to the producing well, even though an increasing percentage of the injected heat is produced in the outlet well. Production is continued until the cost of the steam, and other operating costs, balanced against the value of the produced oil show the operation to be uneconomical.

In the example, methane is used as the inert gas. The term "inert" is intended to indicate that the gas in substantially inert from a chemical standpoint. Thus, air is not considered an inert gas since the oxygen can react with at least some oils, particularly viscous ones, to form precipitates. The gas should also be inert in the sense that it is not highly soluble in the crude oil. Thus, ethane is rarely satisfactory as an inert gas and propane certainly is not suitable as an inert gas. Nitrogen is a satisfactory inert gas but carbon dioxide usually is not. Theoretically, there are several inert gases, such as helium, which might be used. Methane and nitrogen are greatly preferred from an economic standpoint, however.

Propane is the solvent used in the example. The solvent should also be chemically inert in the sense that it does not react to any substantial degree with the oil. The hydrocarbons, propane, isobutane and normal butane, are preferred. Other materials, such as carbon dioxide, are also satisfactory, however, from the standpoint of chemical inertness. Some references insist that carbon dioxide undergoes reaction with some crude oils. The degree of reaction is not sufficient, however, to exclude carbon dioxide from use in our process. From the standpoint of vapor pressure and solubility in the oil, the hydrocarbons, propane, isobutane and normal butane, again are preferred. Ethane and carbon dioxide are so volatile that under most conditions the concentrations of these materials in crude oil in equilibrium with the gas are rather low for our purposes. Ethane and carbon dioxide can be used as solvents, however, particularly at high pressures and low temperatures. The pentanes, on the other hand, are not volatile enough for use in most formations. Their vapor pressures are so low that only very low concentrations of the pentanes can be incorporated in the injected vapors if the entire injected stream is to be in a vapor phase. The pentanes can sometimes be used, however, at high temperatures and low pressures. Mixtures containing propane, butanes and very small amounts of ethane and pentanes are generally used.

The term "solvent" may be somewhat misleading. Actually, the important property is the ability to dissolve in the crude oil and decrease the viscosity of the oil. When the term "solvent" is used herein, it will be understood that an inert vapor, soluble in the crude oil, is intended.

The amount of solvent in the injected vapors should preferably be between about 10 percent and about 30 percent by volume of the total vapors. At least about 5 percent should be included to produce a significant thinning action on the crude oil. The amount of solvent should not exceed about 50 percent in order to insure sufficient gaseous phase to establish and expand a channel through the formation. Theoretically, some of the solvent might be present in the liquid phase. In order to avoid the adverse effects of liquid solvents with viscous crude oils, however, and to avoid relative permeability effects which would result in lower injectivity, the solvent should be injected entirely in the vapor phase at injection temperatures and pressures. This means that under some conditions the concentrations of butanes, and particularly pentanes, must be limited to rather low values in order to insure that the mixture with the inert gas is injected entirely in the vapor phase. At high pressures and low temperatures, the concentration of even propane must sometimes be limited to maintain the mixture with inert gas entirely in the vapor phase.

A very conservative idea of whether a mixture will be entirely in the vapor phase can be obtained by determining if the partial pressure of the solvent in the vapor mixture exceeds the vapor pressure of the solvent at well temperatures. A more accurate determination can be made in the case of mixtures of hydrocarbon solvents and methane by reference to API monograph "Thermodynamic Properties of the Lighter Paraffin Hydrocarbons and Nitrogen," by B. H. Sage and W. N. Lacey, American Petroleum Institute, New York.

In the preferred process, described in the example, a permeable channel is established between Wells A and B by an inert gas alone. Inert gas plus solvent is then injected into Well A to enlarge the channel near Well A. Inert gas and solvent are next injected into Well B to enlarge the channel near Well B. Finally, steam is injected. There are many possible variations to this process, all the variations using a mixture of inert gas and solvent to establish, enlarge, or both establish and enlarge, channels for low pressure, low temperature steam treatment of formations.

Once a channel is established by the enriched gas, the steam can be injected into either of the two wells at the ends of the channel.

In one variation, the mixture of inert gas and solvent is used from the beginning to establish, as well as enlarge, the flow channel between the wells. In another variation, before breakthrough of gas to the second well occurs, the pressure on the injection well is released. This permits the injected gas to drive into the injection well the solvent-thinned oil surrounding the gas flow channel. Then, when injection of gas and solvent vapors is resumed, the vapors can be injected at a much greater rate because of the removal of the volume of crude oil adjacent the original gas flow channel. This process may be repeated, if desired.

The formation surrounding the wells can be hydraulically fractured to establish a high-flow-capacity channel near each well. A flow channel connecting the fractures can then be established and enlarged by injecting into one of the wells and fractures a mixture of inert gas and solvent. Of course, the formation may be fractured at only one of the wells, if desired.

Sometimes, steam injection into one well will already have been started before it is discovered that injection at desirable rates cannot be achieved at available steam pressures. In such cases, a channel can be formed from an output well by use of our process. In this case, the channel is formed under adverse conditions since the well toward which a channel is desired is at high steam pressure. In this case, the mixture of gas and solvent is used principally to decrease resistance to flow around the output well. The injection and back-flow technique are used to accomplish this purpose. Solvent-free inert gas should be injected ahead of the mixture of gas and solvent vapors to provide energy to drive the thinned oil back into the well in the back-flow step. Repetition of the injection and back-flow steps to extend high-flow-capacity channels closer to the steam injection well will usually be desirable. Pressure on the treated well should then be released to extend a low-pressure zone as far back into the formation as possible toward the steam. Breakthrough of the steam into the low-pressure zone is thus facilitated permitting more rapid injection of steam at a lower pressure with more rapid heating of the formation with less heat losses.

While our process is preferably applied where an input and output well are available, the process can be applied to a single well. In this case, the gas and solvent are injected and allowed to back-flow to establish at least one high-flow-capacity channel. Steam is then injected to heat the formation and the well is allowed to back-flow again after the steam treatment to produce the heated oil into the injection well. In a preferred form of this process, inert gas is first injected to establish a flow channel. A mixture of inert gas and solvent is then injected to enlarge the flow channel. The inert gas and solvent are then followed by steam. Upon reversal of flow in this case, the oil is not only heated, but also thinned by solvent and driven out of the formation by the injected gas. In some cases, it may be desirable to inject and withdraw at least one batch of gas and solvent before the gas and solvent preceding the steam is injected. This provides an even larger flow-channel for the steam.

Our process may also be applied to more than two wells. In a multiple well system, a single injection well may supply steam to several output wells. In applying our process to such a system, breakthrough of gas at one output well will usually precede breakthrough at others. In this case, it will be advisable to shut-in or hold back pressure on the first well at which breakthrough occurs. This permits most of the injected gas and solvent to flow toward other wells. During the steam injection portion of the process, if too much flow to one well occurs, sufficient back pressure is applied to this well to limit steam flow to the desired amount. By adjusting back pressures on the wells, substantially uniform steam flow to the wells is possible.

In the example, continued injection of steam drives the heated oil to the output well. This is the preferred process. It will be apparent, however, that other means can be used to recover the heated, less viscous oil. For example, this oil may be recovered by gravity drainage into the existing wells or into new wells which may be drilled. Other driving fluids, such as methane or water, can be used. Fluids, such as gasoline or kerosene, which are miscible with the oil and are liquid at the elevated temperature, can also be used. In such drive processes, it will usually be advisable to plug the high-flow-capacity channel at the output well. This may be done, for example, by injecting a solution of sodium silicate and ammonium sulfate into the formation from the output well and allowing the solution to gel. This prevents excessive bypassing of the driving fluid to the output well. Plugging of the high-flow-capacity channel at the output well, after the formation is hot, may also be advisable, even if steam drive is to be continued. If other wells are present in the formation, such as new wells drilled to produce the warm oil, a driving fluid may be injected into both wells at the ends of the channel to drive oil to the other wells. In this method, the channel is not plugged, but is used to apply a driving pressure over a large area of the formation.

Still other alternates and variations will occur to those skilled in the art. Therefore, we do not wish to be limited to the described examples and variations, but only by the following claims.

We claim:
1. A method for recovering viscous oils from underground formations, said method comprising:
   injecting an inert gas alone into said formation, from a well penetrating said formation,
   injecting into said formation, from the same well, a mixture of an inert gas and an oil solvent, said mixture being injected entirely in the vapor state, only sufficient of said mixture being injected to establish and enlarge a channel extending into said formation from said well,
   injecting steam in the said channel to heat said viscous oil,
   and producing the heated oil from said formation.
2. The method of claim 1 in which the pressure on said well is released after injecting said mixture and oil thinned by said solvent is produced into said well and removed to the surface of the earth before said steam is injected into said formation.
3. The method of claim 1 in which said inert gas is methane and said solvent is principally propane.
4. The method of claim 1 in which the amount of solvent in said mixture is between about 5 percent and about 50 percent by volume.
5. A method for recovering viscous oil from a formation penetrated by Wells A and B, said method comprising:
   injecting through Well A into said formation a mixture of an inert gas and an oil solvent, said mixture being injected entirely in the vapor state, only sufficient of said mixture being injected to break through into Well B, thus forming a channel between said wells,
   injecting steam into the channel through one of the wells to heat the oil in said formation,
   and producing the heated oil from said formation into a well penetrating said formation.
6. The method of claim 5 in which, after breakthrough of said mixture into Well B, but before injecting steam into said formation, the pressure is released on Well A, and the mixture is injected into Well B to enlarge said channel near Well B.
7. The method of claim 5 in which inert gas alone is injected into said formation ahead of said mixture.
8. The method of claim 5 in which said inert gas is methane and said solvent is principally propane.
9. In a process for recovering viscous oil from a formation penetrated by Wells A and B, in which method steam is injected into Well A to heat the oil in the formation, the improvement comprising injecting into Well B, after steam injection has started into Well A, an inert gas followed by a mixture of inert gas and an oil solvent, said mixture being injected entirely in the vapor state, releasing the pressure on Well B, and producing from Well B oil thinned by said solvent, whereby a channel is formed to facilitate flow of steam from Well A to Well B and thus permit more rapid injection of steam with faster heating of the formation with less heat loss.

(References on following page)

References Cited

UNITED STATES PATENTS

| | | | |
|---|---|---|---|
| 2,897,894 | 8/1959 | Draper et al. | 166—9 |
| 3,064,728 | 11/1962 | Gould | 166—2 |
| 3,080,917 | 3/1963 | Walker | 166—9 |
| 3,252,512 | 5/1966 | Baker et al. | 166—2 |
| 3,266,569 | 8/1966 | Sterrett | 166—2 |
| 3,354,958 | 11/1967 | Parker | 166—2 X |
| 3,373,804 | 3/1968 | Glass et al. | 166—2 |
| 3,333,637 | 8/1967 | Prats | 166—40 |

STEPHEN J. NOVOSAD, Primary Examiner

U.S. Cl. X.R.

166—245, 272, 274